April 23, 1929. J. F. O'CONNOR 1,710,186
SHOCK ABSORBING MECHANISM FOR AUTOMOBILES
Filed March 31, 1927
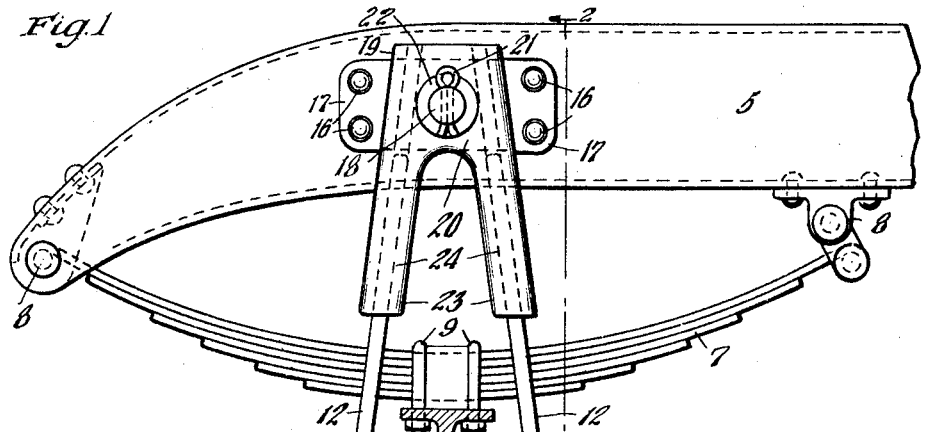
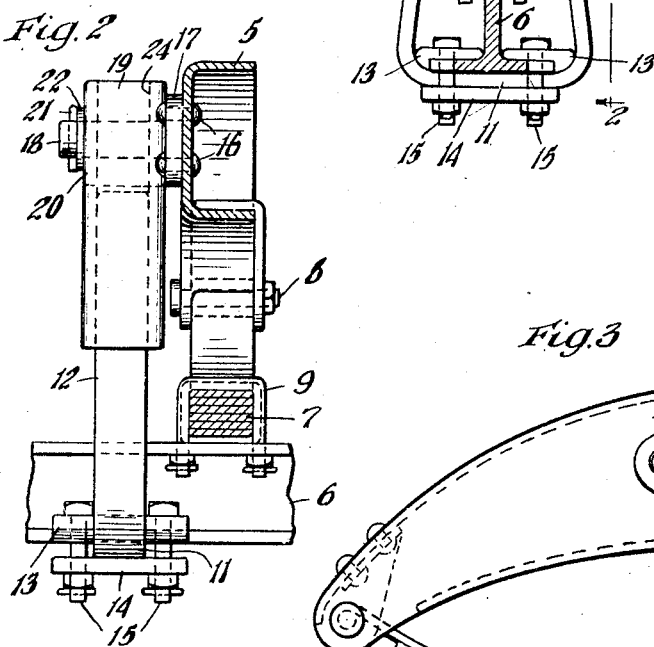
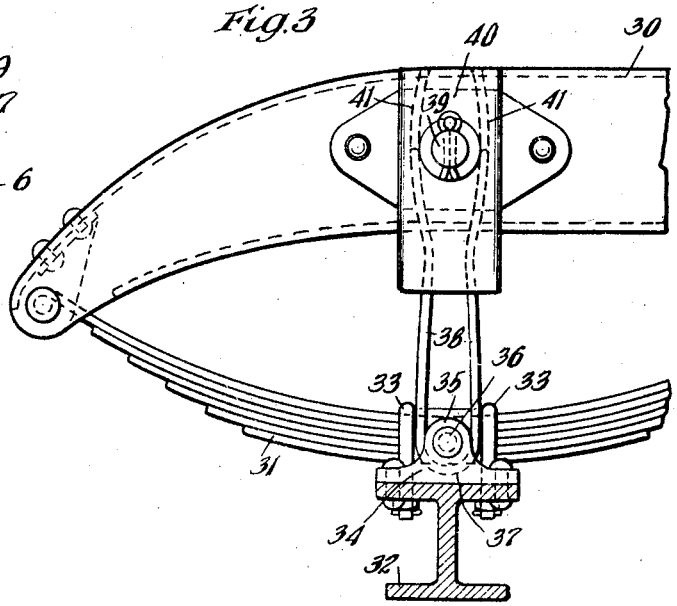
Witness
Wm. Geiger
Inventor
John F. O'Connor
By George I. Haight
His Atty.

Patented Apr. 23, 1929.

1,710,186

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

SHOCK-ABSORBING MECHANISM FOR AUTOMOBILES.

Application filed March 31, 1927. Serial No. 179,862.

This invention relates to shock absorbing mechanisms for automobiles.

An object of the invention is to provide a shock absorbing mechanism for use in connection with motor vehicles, particularly of the heavy bus or coach type, wherein the shock absorbing mechanism is interposed between the frame member of the vehicle and the axle thereof, and operates to assist the usual spring in absorbing shocks transmitted to the vehicle due to the wheels thereof passing inequalities in the roadway.

A more particular object of the invention is to provide a shock absorbing mechanism of the character referred to, in which a resilient member may be connected to the axle of the vehicle and the free end portion of said member disposed in a groove or guide-way formed in means secured to the frame of the vehicle, the engaging surfaces of the guideway being arranged so as to bring about deflection of the resilient member and develop combined frictional and resilient resistance to the relative movement of the frame and axle.

Other and further objects of the invention will more clearly appear from the description and claim hereinafter following.

In the drawings, forming a part of this specification, Figure 1 is a side elevational view of the forward portion of a vehicle chassis, axle, and spring, and showing the invention applied in connection therewith. Figure 2 is a transverse vertical sectional view through the frame and spring member, and showing a rear elevation of the invention, said sectional view being taken substantially on the line 2—2 of Figure 1. And Figure 3 is a side elevational view of a fragment of a vehicle, similar to Figure 1, and showing a different embodiment of the invention.

As shown in the drawings, 5 denotes the forward portion of one side frame of a vehicle, 6 designates the axle of the vehicle, and 7 the usual leaf spring assembly which is secured to the frame by suitable means as at the points 8—8.

The spring assembly 7 bears upon the upper surface of the axle 6 and is secured in position by means of a pair of U-shaped bolts 9 which have threaded ends extending through the upper flanges of the axle, said clamping bolts being secured in position by suitable nuts which bear upon the under surfaces of the flanges on the axle.

Secured to the under surface of the axle is a U-shaped friction element having a bight portion 11, and upwardly extending legs 12—12. The bight portion 11 of the friction element is held in position by clamping members 13—13 and 14, the latter of which is in the form of a plate, fitting along the under surface of the bight portion 11, while the clamping members 13—13 bear against the lower flanges of the axle member 6, the members 13—13 and 14 being secured together by bolts indicated at 15—15. The bight portion 11 and legs 12—12 of the friction element are integrally formed, and the entire element is preferably made up of tempered spring steel.

Secured to the outer side of the frame member 5 by means of rivets 16—16 is a plate 17 having a laterally extending post 18 thereon. Pivotally mounted upon the post 18 is a housing 19, comprising a body portion 20 which fits over the post 18, and is secured in position thereon by means of a cotter pin 21, between which and the body portion is disposed a washer 22. The housing 19 is provided with downwardly diverging portions 23—23, each of which is provided with a groove indicated at 24, converging upwardly and extending entirely through the body portion 20 of the housing, the grooves or channels 24 being adapted for the reception of the ends of the legs 12—12 of the U-shaped friction element.

In operation, assuming approach of the axle member 6 and frame member 5, the housing 19 and the U-shaped member will be moved toward each other, and by reason of the fact that the engaging surfaces provided by the walls of the grooves 24 are out of line with the line of movement of the legs 12—12 of the U-shaped member which would occur but for engagement of the legs 12—12 with the surfaces of said walls, the legs will be flexed or distorted, thereby setting up combined resilient and frictional resistance to the approach of the axle member 6 and frame member 5. Upon separation of the frame member 5 and axle 6, the housing 19 and U-shaped member will set up combined frictional and resilient resistance in a similar manner.

Referring to Figure 3, a somewhat different embodiment of the invention is illustrated. In this construction, the frame member, spring and axle member are designated by the reference characters 30, 31 and 32. The spring 31 is secured to the axle 32 by the U bolts 33.

Affixed to the top surface of the axle 32 is a bracket 34, having side portions riveted to the upper flanges of the axle 32. The bracket 34 is provided with upstanding lugs 35, only one of which shows in Figure 3, but it will be understood that two spaced lugs 35 are provided, and extending through the lugs is a pin 36. Disposed beneath the pin 36 is the bight portion 37 of a friction element, the legs 38—38 of the friction element extending upwardly as shown. Mounted on the frame 30 is a plate having a post 39, upon which is pivotally hung the housing 40, the housing being secured in position by a cotter pin and washer in the same manner as described in connection with Figures 1 and 2. The housing 40 is provided with oppositely disposed vertically extending arcuate slots or grooves 41—41, the lower ends of which extend at a tangent to the arcs, the grooves 41—41 each being adapted for the reception of one of the legs 38—38 of the U-shaped friction member. In operation, relative movement of the frame member 30 and axle member 32 effects travel of the legs 38—38 of the friction element in the grooves of the housing 40 and due to the disposition of the walls defining the grooves in a direction out of line with the movement of the friction element which would take place but for engagement with the walls of said grooves combined frictional and resilient resistance is set up against relative movements of the parts.

While I have herein shown and described what I consider the preferred manner of carrying out the invention, the same is merely illustrative, and I contemplate all changes and modifications which come within the scope of the claim appended hereto.

I claim:

In a shock absorbing mechanism, the combination with the frame member, axle member and spring member of a vehicle; of a U-shaped resilient element disposed about said axle and having the bight thereof secured to said axle, the legs of said U-member extending upwardly; of means pivotally mounted on the frame member, said means being provided with channels adapted for the reception of the legs of the U-shaped member, the width of the channels closely approximating the thickness of the legs of the U-shaped member, the opposed walls of said channels defining extending friction surfaces adapted to co-act with the opposite sides of each of the legs of the U-member, said surfaces being arranged out of line with the line of movement of the legs of said U-shaped element.

In witness that I claim the foregoing I have hereunto subscribed my name this 23rd day of March, 1927.

JOHN F. O'CONNOR.